US008166106B2

(12) United States Patent
Biggs et al.

(10) Patent No.: US 8,166,106 B2
(45) Date of Patent: Apr. 24, 2012

(54) TARGETING APPLICATIONS BASED ON MOBILE OPERATOR

(75) Inventors: Todd Biggs, Kirkland, WA (US); Kamran Rajabi Zargahi, Seattle, WA (US); Todd Thoreau Brix, Woodinville, WA (US); Daniel W. Bouie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 12/760,980

(22) Filed: Apr. 15, 2010

(65) Prior Publication Data

US 2011/0258249 A1 Oct. 20, 2011

(51) Int. Cl.
*G06F 15/16* (2006.01)
*G06F 15/173* (2006.01)

(52) U.S. Cl. ......... 709/203; 709/217; 709/223; 709/226

(58) Field of Classification Search .................. 709/203, 709/217, 223, 226; 713/2; 705/26.1
See application file for complete search history.

(56) References Cited

U.S. PATENT DOCUMENTS

| | | | |
|---|---|---|---|
| 6,178,331 B1 | 1/2001 | Holmes et al. | |
| 7,941,656 B2 * | 5/2011 | Hans et al. | ......................... 713/2 |
| 8,078,158 B2 * | 12/2011 | Backholm | ..................... 709/217 |
| 8,085,423 B2 * | 12/2011 | Dowling et al. | .............. 709/203 |
| 8,099,332 B2 * | 1/2012 | Lemay et al. | ................. 705/26.1 |
| 2007/0011334 A1 | 1/2007 | Higgins et al. | |

OTHER PUBLICATIONS

"Rapidsoft Technologies Joins Windows Marketplace for Mobile with the Applications Developed on Windows Mobile OS", Retrieved at <<http://blog.taragana.com/pr/rapidsoft-technologies-joins-windows-marketplace-for-mobile-with-the-applications-developed-on-windows-mobile-os-7756/ >>, Oct. 21, 2009, pp. 4.

Ayvazian, Berge., "Who is Minding the Mobile AppStores?", Retrieved at <<http://4gtrends.com/?p=1442 ,>>, Aug. 19, 2009, pp. 6.

Duryee, Tricia., "CTIA: Microsoft's Marketplace Will Have Carrier Billing; Facebook, Wallpapers Coming Too", Retrieved at <<http://moconews.net/article/419-ctia-microsofts-marketplace-will-have-carrier-billing-facebook-wallpape/ >>, Mar. 30, 2009, pp. 2.

Higginbotham, Stacey., "Telstra's Planned App Store Is a Shift for Carriers", Retrieved at <<http://gigaom.com/2009/02/24/telstras-planned-app-store-is-a-shift-for-carriers/ >>, Feb. 24, 2009, pp. 11.

Ho, Victoria., "Ovum: Let OS-Makers Run App Stores", Retrieved at <<http://www.zdnetasia.com/news/communications/0,39044192,62051325,00.htm >>, Feb. 20, 2009, pp. 3.

Zheng, Long., "Microsoft to Launch "Skymarket" Applications Marketplace for Windows Mobile 7", Retrieved at <<http://www.istartedsomething.com/20080831/microsoft-launch-skymarket-applications-marketplace-windows-mobile-7/ >>, Aug. 31, 2008, pp. 10.

Kowalczyk, et al., "InterMarket—Towards Intelligent Mobile Agent e-Marketplaces", Retrieved at <<http://ieeexplore.ieee.org/stamp/stamp.jsp?arnumber=00999849 >>, Proceeding of the 9th IEEE International Conference on Engineering of Computer-Based Systems, Apr. 2002, pp. 8.

* cited by examiner

*Primary Examiner* — Quang N. Nguyen

(57) ABSTRACT

Filtering mobile applications in a mobile applications store based on a determined mobile operator associated with a mobile computing device. Mobile operators select mobile applications to be made available to mobile computing devices associated with the mobile operators. Users visit the online mobile applications store via the mobile computing devices. During the visits, the mobile operators associated with the mobile computing device are determined. The mobile applications selected by the mobile operators are presented to the mobile computing devices. In some embodiments, branding content from the mobile operators is provided to the mobile computing device when presenting the filtered mobile applications.

16 Claims, 3 Drawing Sheets

TARGETING APPLICATIONS BASED ON MOBILE OPERATOR

BACKGROUND

Mobile applications are a rapidly developing segment of the mobile market. The mobile applications are designed to run on handheld computers, personal digital assistants (PDAs), smartphones, cellular phones, and other mobile devices. Users shop for the mobile applications by visiting online application stores with their mobile devices. The online application stores may feature particular mobile applications from particular vendors. With the existing online application stores, however, mobile operators are unable to identify or promote the mobile applications that are of particular interest to users of the mobile operators.

SUMMARY

Embodiments of the disclosure select mobile applications for presentation to a mobile computing device. A request is received from the mobile computing device for information relating to one or more mobile applications available within a mobile applications store. From the received request, a mobile operator associated with the mobile computing device is determined. Based on the determined mobile operator, a set of the mobile applications available to the mobile computing device is identified. Metadata associated with the identified set of mobile applications is provided to the mobile computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
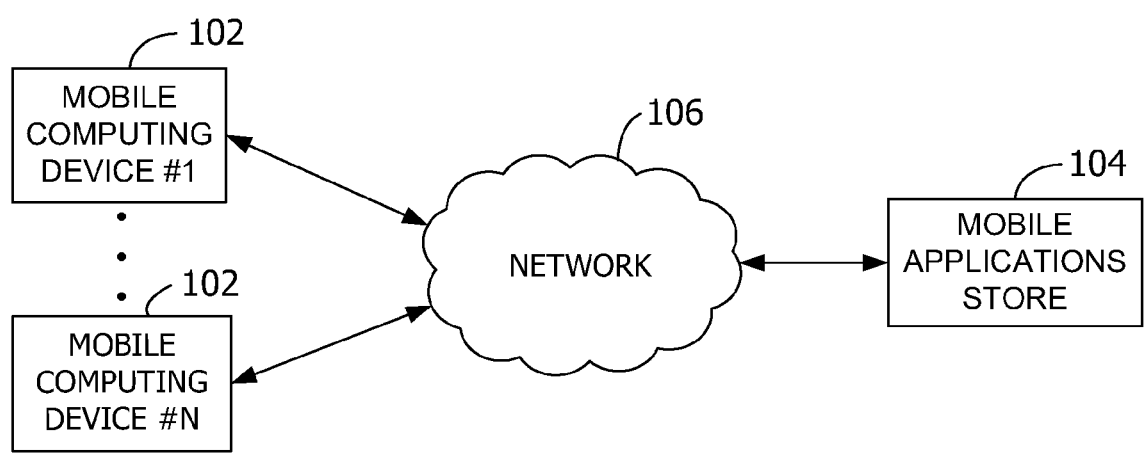
FIG. 1 is an exemplary block diagram illustrating mobile computing devices communicating with a mobile applications store.

Referring to the figures, embodiments of the disclosure enable mobile operators 212 to target users with mobile applications 208. In some embodiments, the mobile operators 212 identify, to a mobile applications store 104, the mobile applications 208 to be presented to users associated with the mobile operators 212. The mobile applications store 104 identifies the mobile operator 212 associated with a mobile computing device 102 visiting the mobile applications store 104. Based on the identified mobile operator 212, the mobile applications store 104 provides a set of the mobile applications 208 for display to the mobile computing device 102.

In some embodiments, aspects of the disclosure provide an "end-cap" for each mobile operator 212 within the mobile applications store 104 or other marketplace. The disclosure provides an opportunity for the mobile operators 212 to select and rank the mobile applications 208, and also provide branding content to accompany presentation of the selected mobile applications 208.

While aspects of the disclosure are discussed herein with reference to the mobile applications 208, further aspects of the disclosure are operable with mobile services, content, or other data.

Referring again to FIG. 1, an exemplary block diagram illustrates mobile computing devices 102 communicating with the mobile applications store 104. The mobile computing devices 102, such as mobile computing device #1 through mobile computing device #N, are associated with one or more users (not shown). The mobile computing devices 102 include portable computing devices such as laptops, netbooks, gaming devices, and/or portable media players. However, the mobile computing devices 102 may include any device executing instructions (e.g., application programs) to provide data. Further, each of the mobile computing devices 102 may represent a group of processing units or other computing devices.

The mobile computing devices 102 communicate with the mobile applications store 104 via a network 106. Exemplary networks 106 include wired and/or wireless networks, and may represent local area networks or global networks such as the Internet. In embodiments in which the network 106 includes wireless networks, the mobile computing devices 102 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication. In some embodiments, the network 106 includes a wireless cellular network providing Internet access.

The mobile applications store 104 includes one or more computing devices such as computing device 202 operating to provide the mobile computing devices 102 with access to content. The content includes, for example, web pages and scripts for presenting one or more mobile applications 208 to users of the mobile computing devices 102. In some embodiments, the mobile applications store 104 is accessible via the Internet by mobile computing devices 102 executing browsers to browse, search, select, purchase, and download the mobile applications 208.

Figure 2:
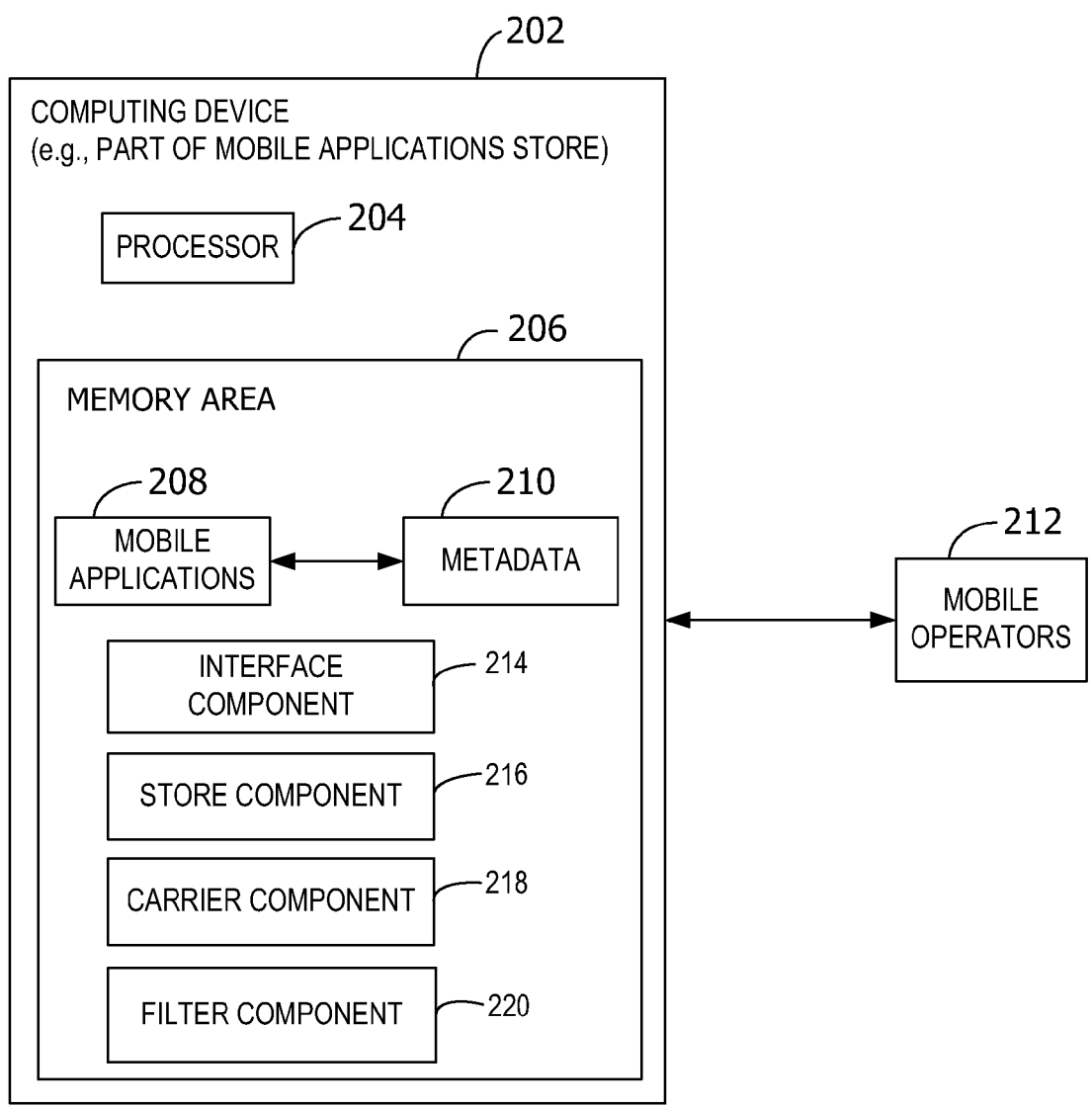
FIG. 2 is an exemplary block diagram illustrating a computing device associated with the mobile applications store.

Referring next to FIG. 2, an exemplary block diagram illustrates the computing device 202 associated with the mobile applications store 104. The computing device 202 operates to select applications for presentation to the mobile computing device 102 based on, for example, the mobile operator 212. While illustrated as a single computing device 202 in FIG. 2, aspects of the disclosure contemplate other hardware configurations to provide the functionality associated with the computing device 202. For example, the functionality may be provided by a cloud service, a network of peer-to-peer devices, or other hardware or software configuration.

The computing device 202 has at least one processor 204 and one or more computer-readable media such as a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202 (e.g., by a cloud service). In some embodiments, the processor 204 is programmed to execute instructions such as those illustrated in the figures (e.g., FIG. 3).

The memory area 206 includes any quantity of media associated with or accessible to the computing device 202. The memory area 206 may be internal to the computing device 202 (as shown in FIG. 2), external to the computing device 202 (not shown), or both (not shown).

In some embodiments, the memory area 206 stores a plurality of mobile applications 208 (e.g., binaries) along with metadata 210 associated therewith. In other embodiments, the binaries for the mobile applications 208 are stored elsewhere (e.g., another memory area), but are accessible by the computing device 202. The mobile applications 208 are provided by one or more vendors such as independent software vendors (ISVs). The metadata 210 identifies one or more of the mobile operators 212 associated with each of the plurality of mobile applications 208. In some embodiments, the metadata 210 further identifies one or more device manufacturers associated with each of the plurality of mobile applications 208. The device manufacturers represent the manufacturers of the mobile computing devices 102. Exemplary metadata 210 includes one or more of the following for each of the plurality of mobile applications 208: a name, a description, a cost, a mobile operator 212, and a device manufacturer.

The metadata 210 may be received from various sources or created by the computing device 202 based on data from the various sources. For example, the metadata 210 may represent a compilation of data from the vendors who created the mobile applications 208 (e.g., application name, description, cost) and data from the mobile operators 212 (e.g., names of mobile operators 212 who have selected particular mobile applications 208).

In other embodiments, the metadata 210 includes lists of the mobile applications 208 where each of the lists corresponds to a selection of the mobile applications 208 by the mobile operators 212. For example, a first mobile operator 212 may select a first plurality of the mobile applications 208 stored as a list (sorted or unsorted), and a second mobile operator 212 may select a second plurality of the mobile applications 208 stored as another list (sorted or unsorted). The selections by the mobile operators 212 are stored as part of the metadata 210 by the computing device 202. In further embodiments, the selections may be ranked by the mobile operator 212 (e.g., to "feature" one or more of the mobile applications 208).

The processor 204 is programmed to receive a request from a device such as the mobile computing device 102 for information relating to one or more of the plurality of mobile applications 208. The request may take the form of, for example, a visit by a user of the mobile computing device 102 to the mobile applications store 104 (e.g., online). For example, the user may execute an application (e.g., a browser) on the mobile computing device 102 to connect to the mobile applications store 104. The request may include data identifying or describing the mobile computing device 102. For example, the request may include an international mobile subscriber identity (IMSI) and/or a current operator name (CON) and service provider name (SPN) pair associated with the mobile computing device 102.

The processor 204 is also programmed to determine, from the received request, one of the mobile operators 212 associated with the mobile computing device 102. For example, the mobile operator 212 may be determined based on the received IMSI, or the received CON/SPN pair. In some embodiments, the processor 204 is further programmed to determine one of the device manufacturers associated with the mobile computing device 102. As an example, the mobile operator 212 may be determined to be "Sprint" and the device manufacturer may be determined to be "Sanyo."

Based on the identified determined mobile operator 212 (and possibly the determined device manufacturer), the processor 204 is further programmed to identify a set of the mobile applications 208 for presentation to the mobile computing device 102. For example, the processor 204 may search the mobile applications 208 based on the metadata 210 to identify the mobile applications 208 associated with the mobile operator 212. In other embodiments, the mobile applications 208 may be searched or filtered based on the determined device manufacturer. In such embodiments, the device manufacturer criteria may act as a further filter specified by the mobile operator 212. For example, the mobile operators 212 may select separate sets of the mobile applications 208 for each of the device manufacturers. In this manner, the mobile operators 212 may feature or promote particular mobile applications 208 per device manufacturer.

The processor 204 is further programmed to provide metadata 210 associated with the identified set of mobile applications 208 to the mobile computing device 102. For example, the processor 204 may provide the metadata 210 as a web page for display by the mobile computing device 102 to the user of the mobile computing device 102. In some embodiments, branding is applied to the metadata 210 to provide a look and feel consistent with the determined mobile operator 212. For example, branding content such as logos, colors, audio, or video may accompany the provided metadata 210 to enable the mobile operators 212 to associate their brands with the selected mobile applications 208.

The user browses the identified set of mobile applications 208, and may purchase and download one or more of the mobile applications 208. In such an embodiment, the processor 204 is programmed to receive a selection of the mobile applications 208 from the identified set based on the provided metadata 210. Binaries of the selected mobile applications 208 are provided to the mobile computing device 102 (e.g., after purchase by the user if a fee is associated with any of the selected mobile applications 208).

The memory area 206 further stores one or more computer-executable components for implementing aspects of the disclosure. Exemplary components include an interface component 214, a store component 216, a carrier component 218, and a filter component 220. Execution of these components is described below with reference to FIG. 3.

At least a portion of the functionality of the various elements in FIG. 2 may be performed by other elements in FIG. 2, or an entity (e.g., processor, web service, server, application program, computing device, etc.) not shown in FIG. 2.

Figure 3:
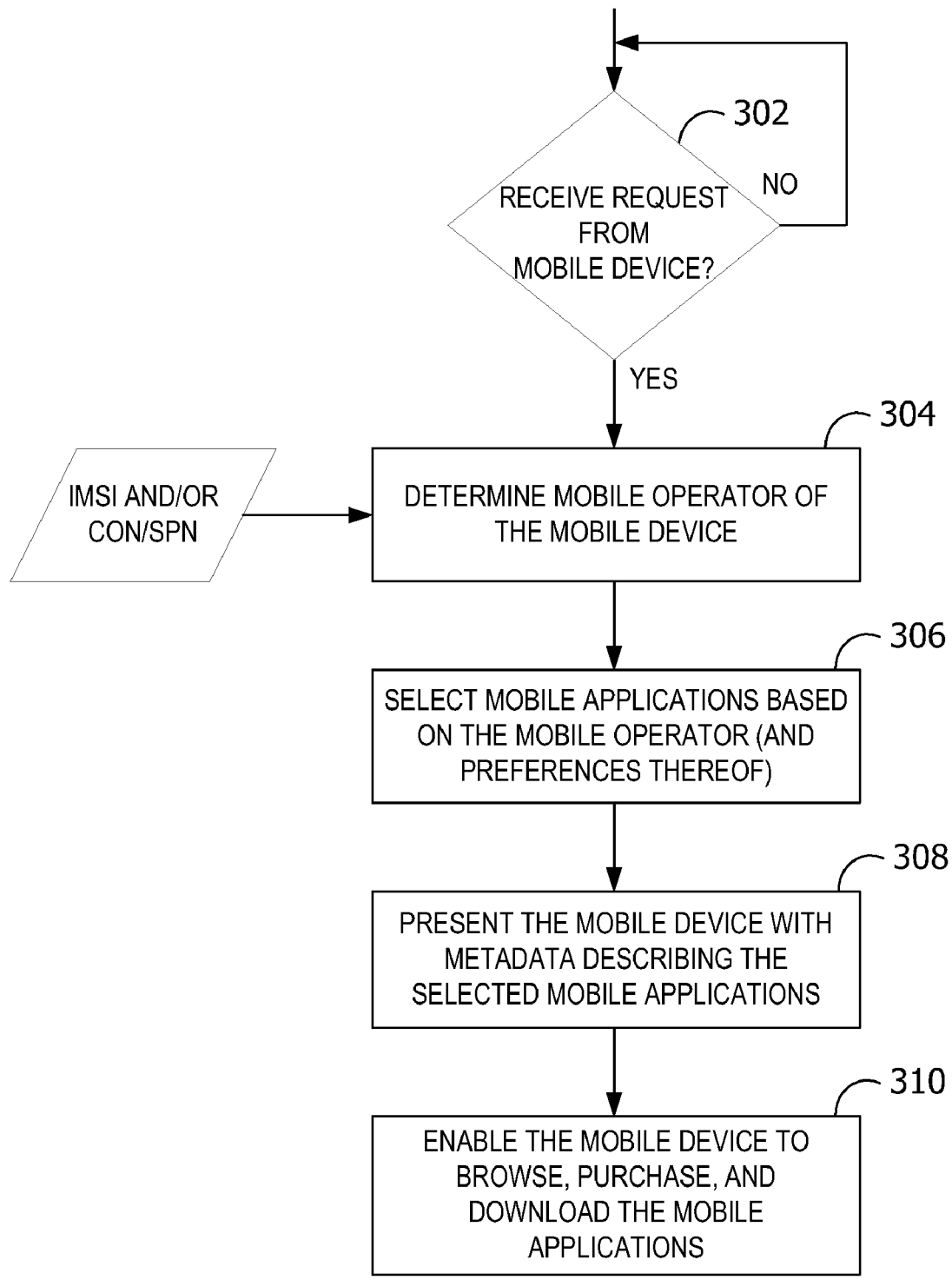
FIG. 3 is an exemplary flow chart illustrating operation of the computing device from FIG. 2 to filter the mobile applications based on the mobile operator associated with the mobile computing device.

Referring next to FIG. 3, an exemplary flow chart illustrates operation of the computing device 202 in FIG. 2 to filter the mobile applications 208 based on the mobile operator 212 associated with the mobile computing device 102. If a request is received at 302 from the mobile computing device 102 (e.g., the user visits the mobile applications store 104 with the mobile computing device 102), the mobile operator 212 of the mobile computing device 102 is determined at 304. For example, the IMSI and/or CON/SPN pair is used to identify the mobile operator 212. At 306, the mobile applications 208 available within the mobile applications store 104 are filtered based on the mobile operator 212 to identify the set of mobile applications 208 to present to the user of the mobile computing device 102. In some embodiments, the mobile applications 208 are further filtered based on the device manufacturer of the mobile computing device 102. In this manner, the mobile operator 212 is able to target the mobile applications 208 to particular mobile computing devices 102. Metadata 210 associated with the identified set of mobile applications 208 is provided or presented at 308 to the mobile computing device 102. The mobile computing device 102 displays the metadata 210 to the user (e.g., in a browser or other application executing on the mobile computing device 102). For example, an application name, application description, and cost may be included in the metadata 210. The user is able to browse, purchase, and download one or more of the mobile applications 208 at 310.

In some embodiments, the mobile operator 212 is determined at 304 by analyzing the IMSI and/or the CON/SPN. The mobile computing device 102 may obtain the IMSI from a subscriber identity module (SIM) on the mobile computing device 102, and include the IMSI in the request received by the computing device 202 at 302. The IMSI is a 15-digit value including a mobile country code (MCC), a mobile network code (MNC), and a mobile subscriber identification number (MSIN). The MCC is a three-digit value representing the country/locale of the mobile computing device 102. The MNC is a two- or three-digit value representing the mobile operator(s) 212 the mobile computing device 102 is using. For example, the IMSI may be an IMSI_m (based on the mobile identification number) or an IMSI_t (not based on the mobile identification number). The mobile identification number is typically the 10-digit telephone number of the mobile computing device 102. An exemplary IMSI_m is 3100000000000 and an exemplary IMSI_t is 31003876768768.

The mobile computing device 102 obtains the CON and SPN from, for example, configuration settings or other memory area on the mobile computing device 102. An example of a CON and SPN pair includes CON="Spring PCS" and SPN="Sprint". Another example pair is CON="Telstra" and SPN="Telstra". In some embodiments, SPN is empty.

The CON/SPN pair may be used as a backup to the IMSI to determine the mobile operator 212 in some embodiments. In other embodiments, the CON/SPN pair is used without reference to the IMSI.

Further, one or more of the operations illustrated in FIG. 3 may be implemented as software instructions encoded on a computer-readable medium, in hardware programmed or designed to perform the operations, or both. As an example, the operations in FIG. 3 may be implemented as computer-executable components or other software such as in the components illustrated in FIG. 2. In such an example, the interface component 214, when executed by the processor 204, causes the processor 204 to receive metadata 210 associated with a plurality of the mobile applications 208 available within the mobile applications store 104. The metadata 210 identifies one or more mobile operators 212 associated with each of the plurality of mobile applications 208. In some embodiments, the metadata 210 further includes a priority value associated with each of the plurality of mobile applications 208. The priority value represents, for example, a ranking or other criterion defining placement of the mobile application 208 during presentation of the mobile application 208 to the mobile computing device 102.

The store component 216, when executed by the processor 204, causes the processor 204 to receive a request from the mobile computing device 102 for information relating to the mobile applications 208. The carrier component 218, when executed by the processor 204, causes the processor 204 to determine, from the request received by the store component 216, the mobile operator 212 associated with the mobile computing device 102. The filter component 220, when executed by the processor 204, causes the processor 204 to identify, based on the mobile operator 212 determined by the carrier component 218, a set of the mobile applications 208 for presentation to the mobile computing device 102. The filter component 220 further arranges the identified set of mobile applications 208 based on the priority values associated with the mobile applications 208 in the identified set.

The store component 216 further provides the metadata 210 associated with the set of mobile applications 208 identified by the filter component 220 to the mobile computing device 102.

In some embodiments, the operations illustrated in FIG. 3 are performed by the computing device 202. In other embodiments, one or more of the operations illustrated in FIG. 3 are performed by another computing device (e.g., as a web service) or peer-to-peer devices. Further, one or more of the operations illustrated in FIG. 3 may be performed by the mobile computing devices 102.

Additional Examples

While embodiments have been described with reference to data collected from users, aspects of the disclosure provide notice to the users of the collection of the data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selecting mobile applications 208 based on the mobile operator 212 of the mobile computing device 102 for presentation to the mobile computing device 102, and exemplary means for filtering the mobile applications 208 available within the mobile applications store 104 based on information associated with the mobile computing device 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for selecting applications for presentation to a mobile computing device, said system comprising:
   a memory area for storing metadata associated with a plurality of mobile applications available within a mobile applications store, said metadata identifying one or more mobile operators associated with each of the plurality of mobile applications, said metadata including a priority value associated with each of the plurality of mobile applications, said metadata further identifying one or more device manufacturers associated with each of the plurality of mobile applications, said plurality of mobile applications being associated with the mobile applications store; and
   a processor programmed to:
   receive a request from a mobile computing device for information relating to one or more of the plurality of mobile applications;
   determine, from the received request, one of the mobile operators associated with the mobile computing device and one of the device manufacturers associated with the mobile computing device;
   identify, based on the determined mobile operator and the determined device manufacturer, a set of mobile applications available to the mobile computing device;
   arrange the identified set of mobile applications based on the priority values associated with the mobile applications in the identified set;
   provide metadata associated with the identified set of mobile applications to the mobile computing device;
   receive a selection of the mobile applications within the identified set based on the provided metadata; and
   provide binaries of the selected mobile applications to the mobile computing device;
   wherein the request includes a current operator name (CON) and a service provider name (SPN), and wherein the processor is further programmed to determine the mobile operator associated with the mobile computing device based on the received CON and SPN.

2. The system of claim 1, wherein the request includes an international mobile subscriber identity (IMSI) associated with the mobile computing device, and wherein the processor is programmed to determine the mobile operator associated with the mobile computing device based on the received IMSI.

3. The system of claim 1, wherein the metadata comprises one or more of the following for each of the plurality of mobile applications: a name, a description, a cost, a mobile operator, and a device manufacturer.

4. The system of claim 1, wherein the processor is further programmed to provide branding content associated with the determined mobile operator to the mobile computing device.

5. The system of claim 1, further comprising means for selecting mobile applications based on the mobile operator of the mobile computing device for presentation to the mobile computing device.

6. The system of claim 1, further comprising means for filtering the mobile applications available within the mobile applications store based on information associated with the mobile computing device.

7. A method comprising:
   receiving a request from a mobile computing device for information relating to one or more mobile applications available within a mobile applications store;
   determining, from the received request, a mobile operator and a device manufacturer associated with the mobile computing device;
   identifying, based on the determined mobile operator and the determined device manufacturer, a set of the mobile applications available to the mobile computing device;
   arranging the identified set of mobile applications based on priority values associated with the mobile applications in the identified set;
   providing, to the mobile computing device, metadata associated with the identified set of mobile applications;
   receiving a selection of the mobile applications within the identified set based on the provided metadata; and
   providing binaries of the selected mobile applications to the mobile computing device;
   wherein the request includes a current operator name (CON) and a service provider name (SPN), and wherein determining the mobile operator associated with the mobile computing device comprises determining the mobile operator based on the CON and SPN.

8. The method of claim 7, wherein the request includes an international subscriber identity module (IMSI) associated with the mobile computing device, and wherein determining the mobile operator includes determining the mobile operator based on the IMSI.

9. The method of claim 7, wherein providing the metadata comprises providing one or more of the following for each of the mobile applications in the identified set of mobile applications: an application name, an application description, and a cost.

10. The method of claim 7, further comprising providing branding content associated with the determined mobile operator to the mobile computing device.

11. The method of claim 7, wherein other mobile computing devices associated with other mobile operators are unable to view the identified set of the mobile applications.

12. The method of claim 7, wherein identifying the set of mobile applications comprises identifying the set of mobile applications based on metadata correlating the mobile applications to the mobile operators.

13. The method of claim 12, wherein the metadata comprises lists of the mobile applications provided by the mobile operators.

14. One or more computer-readable memories having computer-executable components, said components comprising:

an interface component that when executed by at least one processor causes the at least one processor to receive metadata associated with a plurality of mobile applications available within a mobile applications store, said metadata identifying one or more mobile operators associated with each of the plurality of mobile applications, said metadata further including a priority value associated with each of the plurality of mobile applications, said plurality of mobile applications being associated with the mobile applications store;

a store component that when executed by at least one processor causes the at least one processor to receive a request from a mobile computing device for information relating to the mobile applications;

a carrier component that when executed by at least one processor causes the at least one processor to determine, from the request received by the store component, a mobile operator associated with the mobile computing device, wherein the request includes a current operator name (CON) and a service provider name (SPN), and wherein the carrier component determines the mobile operator associated with the mobile computing device based on the CON and SPN; and a filter component that when executed by at least one processor causes the at least one processor to identify, based on the mobile operator determined by the carrier component, a set of the mobile applications for presentation to the mobile computing device, wherein the filter component further arranges the identified set of mobile applications based on the priority values associated with the mobile applications in the identified set, wherein the store component further provides the metadata associated with the set of mobile applications identified by the filter component to the mobile computing device, receives a selection of the mobile applications within the identified set based on the provided metadata, and provides binaries of the selected mobile applications to the mobile computing device.

15. The computer-readable memories of claim 14, wherein a user of the mobile computing device browses the mobile applications store with the mobile computing device.

16. The computer-readable memories of claim 14, wherein other mobile computing devices associated with other mobile operators are unable to view the set of mobile applications identified by the filter component.

* * * * *